(12) United States Patent
Norman et al.

(10) Patent No.: US 8,784,999 B2
(45) Date of Patent: Jul. 22, 2014

(54) WELDABLE METAL ARTICLE

(75) Inventors: Andrew Norman, Beverwijk (NL); Sabine Spangel, Koblenz (DE)

(73) Assignee: Aleris Aluminum Koblenz GmbH, Koblenz (DE)

( * ) Notice: Subject to any disclaimer, the term of this patent is extended or adjusted under 35 U.S.C. 154(b) by 287 days.

(21) Appl. No.: 13/257,568

(22) PCT Filed: Apr. 14, 2010

(86) PCT No.: PCT/EP2010/054900
§ 371 (c)(1),
(2), (4) Date: Nov. 28, 2011

(87) PCT Pub. No.: WO2010/119070
PCT Pub. Date: Oct. 21, 2010

(65) Prior Publication Data
US 2012/0064367 A1    Mar. 15, 2012

Related U.S. Application Data

(60) Provisional application No. 61/241,427, filed on Sep. 11, 2009.

(30) Foreign Application Priority Data

Apr. 16, 2009 (EP) .................... 09158018

(51) Int. Cl.
| | |
|---|---|
| *B32B 15/01* | (2006.01) |
| *C22C 21/06* | (2006.01) |
| *B22D 7/00* | (2006.01) |
| *C22F 1/047* | (2006.01) |
| *C22C 21/02* | (2006.01) |
| *B23K 35/02* | (2006.01) |
| *B23K 35/28* | (2006.01) |
| *B23K 26/32* | (2014.01) |
| *C22C 1/02* | (2006.01) |

(52) U.S. Cl.
CPC .............. *C22C 21/06* (2013.01); *B32B 15/016* (2013.01); *C22F 1/047* (2013.01); *C22C 21/02* (2013.01); *B23K 35/0266* (2013.01); *B23K 2203/10* (2013.01); *B23K 35/286* (2013.01); *B23K 26/32* (2013.01); *C22C 1/02* (2013.01)
USPC .............................. 428/654; 420/542; 72/461

(58) Field of Classification Search
None
See application file for complete search history.

(56) References Cited

U.S. PATENT DOCUMENTS

| | | | |
|---|---|---|---|
| 5,624,632 | A | 4/1997 | Baumann et al. |
| 6,139,653 | A | 10/2000 | Fernandes et al. |
| 6,337,147 | B1 | 1/2002 | Haszler et al. |
| 6,531,004 | B1 | 3/2003 | Lenczowski et al. |
| 2005/0011630 | A1 | 1/2005 | Anderson et al. |
| 2008/0008903 | A1 | 1/2008 | Bull et al. |
| 2009/0226343 | A1 | 9/2009 | Telioui et al. |

FOREIGN PATENT DOCUMENTS

| | | | |
|---|---|---|---|
| EP | 1177323 B1 | | 4/2003 |
| JP | 2006176852 A | * | 7/2006 |
| WO | 0054967 A1 | | 9/2000 |
| WO | 2007020041 A2 | | 2/2007 |
| WO | 2007070731 A1 | | 6/2007 |
| WO | 2007118313 A1 | | 10/2007 |

OTHER PUBLICATIONS

English Machine Translation of JP2006-176852 translated Sep. 17, 2013.*
International Search Report from PCT/EP2010/054900 dated Oct. 27, 2010.

* cited by examiner

*Primary Examiner* — Adam Krupicka
(74) *Attorney, Agent, or Firm* — Novak Druce Connolly Bove + Quigg LLP

(57) ABSTRACT

The invention relates to an extruded or rolled clad metal article having a core metal layer and a cladding metal layer on at least one surface of the core layer, wherein the metals of the core metal layer and the cladding metal layer are each aluminum alloys, preferably an aluminum-magnesium alloy, having at least Sc in a range of 0.05% to 1%, and wherein the Sc-content in the core metal layer is lower than in the cladding metal layer. This further relates to a welded structure incorporating such a metal article.

18 Claims, No Drawings

WELDABLE METAL ARTICLE

CROSS-REFERENCE TO RELATED APPLICATIONS

This application is a §371 National Stage Application of International Application No. PCT/EP2010/054900, filed on 14 Apr. 2010, claiming the benefit of European Patent Application No. 09 158 018.3 filed on 16 Apr. 2009 and U.S. Provisional Application No. 61/241,427, filed Sep. 11, 2009.

FIELD OF THE INVENTION

This invention relates to a metal article made from an aluminium alloy containing scandium. The invention further relates to a welded structure incorporating such a metal article. Products made from this metal article are very suitable for applications in the transport industry such as application in aerospace products, vessels, road and rail vehicles.

BACKGROUND TO THE INVENTION

As will be appreciated herein below, except as otherwise indicated, aluminium alloy designations and temper designations refer to the Aluminum Association designations in Aluminum Standards and Data and the Registration Records, as published by the Aluminum Association in 2009.

For any description of alloy compositions or preferred alloy compositions, all references to percentages are by weight percent unless otherwise indicated.

There are several Sc-containing aluminium alloys known in the art.

U.S. Pat. No. 5,624,632 discloses an aluminium alloy product, the composition is substantially zinc-free and lithium-free, and has 3 to 7% Mg, 0.05 to 0.2% Zr, 0.2 to 1.2% Mn, up to 0.15% Si, and 0.05 to 0.5% of a dispersoid-forming element selected from the group consisting of: Sc, Er, Y, Gd, Ho, or Hf, balance aluminium and inevitable impurities. The aluminium alloy product is said to be especially suited for applications where damage tolerance is required.

U.S. Pat. No. 6,139,653 discloses aluminium alloy consisting of 4 to 8% Mg, 0.05 to 0.6% Sc, 0.1 to 0.5% Mn, 0.05 to 2% Cu or Zn, 0.05 to 0.20% Hf or Zr, and the balance aluminium and incidental impurities. It further discloses an aluminium alloy consisting of 4 to 8% Mg, 0.05 to 0.6% Sc, 0.05-2% Cu or Zn, 0.05 to 0.20% Hf or Zr, and the balance aluminium and incidental impurities.

U.S. Pat. No. 6,531,004 discloses a weldable, corrosion-resistant aluminium alloy having 5 to 6% Mg, 0.05 to 0.15% Zr, 0.05 to 0.12% Mn, 0.01 to 0.2% Ti, 0.05 to 0.5% by total of Sc and Tb, and at least 0.1 to 0.2% Cu or 0.1 to 0.4% Zn, the balance being aluminium and unavoidable contaminants not exceeding 0.1% Si. It is reported in this document that in the sensitised condition due to the low Mn-content an improved corrosion resistance is obtained.

There is a demand for aluminium alloy articles containing Sc as purposive alloying element with an improved balance in strength and weldability.

DESCRIPTION OF THE INVENTION

It is an object of the invention to provide an aluminium alloy article containing Sc and having an improved balance in strength and weldability.

It is another object of the invention to provide a welded structure incorporating an aluminium alloy article containing Sc and having an improved balance in strength and weldability.

These and other objects and further advantages are met or exceeded by the present invention providing an extruded or rolled clad metal article having a core metal layer and a cladding metal layer on at least one surface of the core metal layer, wherein said metals of said core metal layer and said cladding metal layer are each aluminium alloys having at least Sc in a range of about 0.05% to 1%, and wherein the Sc-content in the core layer is lower than in said cladding metal layer.

In accordance with the invention it has been found that to achieve good mechanical properties in the bulk of the metal article a different Sc level is required compared to for achieving good welding characteristics, and whereby higher Sc levels are favourable for the welding characteristics, such as for example by means of laser beam welding. A small variation in the Sc content may have a significant effect on one of the relevant engineering properties and if one were to provide an aluminium alloy article made of one single chemical composition a balance has to be found. However, by providing a clad metal article such that the core metal layer and the cladding metal layer have different levels of Sc as purposive alloying element, and whereby the cladding metal layer is metallurgically bounded to the core metal layer, an improved article is obtained that combines favourable mechanical properties of the core metal layer with the favourable welding characteristics of the cladding metal layer having a higher Sc content than the core metal layer.

There is also an economical advantage in that a relatively high level of Sc of rather expensive Sc is only required in a selected part of the whole metal article.

The difference in Sc content between the core and cladding metal layers can be tailored to meet specific demands in engineering properties. In an embodiment the difference in the Sc-content between the core metal layer and the cladding metal layer is 0.02% or more, and preferably 0.04% or more, for example a difference of about 0.06% or of about 0.08%.

In an embodiment the metals of the core metal layer and the cladding metal layer are aluminium alloys comprising about 3% to 8% Mg and further at least Sc in a range of 0.05% to 1%.

In an embodiment said metals of said core metal layer and said cladding metal layer are aluminium alloys having, in wt. %,
Mg about 3% to 8%, preferably about 3.8% to 6%,
Mn up to about 1.4%, preferably about 0.05% to 1.2%,
Sc 0.05% to 1%
Ag up to about 0.5%
Zn up to about 2%
Cu up to about 2%
Li up to about 3%,
optionally at least one or more elements selected from the group consisting of (Zr 0.03% to 0.4%, Cr 0.03% to 0.4%, Hf 0.03% to 0.4%, and Ti 0.005% to 0.4%),
Fe up to about 0.35%
Si up to about 0.25%,
inevitable impurities and balance aluminium.

Typically inevitable impurities are present in a range of each up to 0.05%, and in total up to 0.25%.

Iron can be present in a range of up to about 0.35% and preferably is kept to a maximum of about 0.25%. A typical preferred iron level would be in the range of up to 0.14%.

Silicon can be present in a range of up to about 0.25% and preferably is kept to a maximum of about 0.2%. A typical preferred Si level would be in the range of up to 0.12%, for example at a level of about 0.04%.

In an embodiment zinc can be present up to about 0.4%. Yet, in another embodiment Zn can be present as a strengthening element in a range of about 0.4% to 2%. A relatively high amount of Zn also has a positive effect of the corrosion resistance of the metal article.

Cu can be present in the AlMgSc-alloy as strengthening element in a range up to about 2%. However, in applications of the metal article where the corrosion resistance is a very critical engineering property, it is preferred to maintain the Cu at a low level of 0.25% or less, and preferably at a level of 0.1% or less, and more preferably at a level of 0.04% or less.

Li can be present in the AlMgSc alloy in a range of up to about 3% to provide the product with a low density, high strength, good weldability, and a very good natural ageing response. If purposively added, the preferred Li level is in the range of 0.5 to 3%, and more preferably in a range of about 1 to 2.5%. In an alternative embodiment there is no purposive addition of Li and should be kept at impurity level of maximum 0.05%, and more preferably the aluminium alloy is lithium-free.

The AlMgSc alloy may contain one or more elements selected from the group consisting of Zr 0.03% to 0.4%, Cr 0.03% to 0.4%, Hf 0.03% to 0.4%, Ti 0.005% to 0.4%. In the Al—Mg—Sc the preferred alloying element is Zr. A preferred range of the Zr addition is about 0.05% to 0.2%.

Ti may be added to the AlMgSc alloy as strengthening element or for improving the corrosion resistance or for grain refiner purposes.

In a particular preferred embodiment said metals of said core metal layer and said cladding metal layer are each aluminium alloys consisting of, in wt. %:
Mg about 3.8% to 5.1%, preferably about 3.8% to 4.7%,
Mn up to about 0.4%, preferably up to about 0.25%,
Sc 0.05% to 1%, and preferably 0.05% to 0.4%,
Zn up to about 0.4%
Cu up to about 0.25%
Cr up to about 0.10%
Zr about 0.05 to 0.20%
Ti up to about 0.20%
Fe up to 0.35%, preferably up to about 0.15%,
Si up to 0.25%, preferably up to about 0.10%,
others and inevitable impurities each maximum 0.05%, total maximum 0.15, and balance aluminium.

Save to the difference in Sc content as defined in accordance with this invention for the core metal layer and the cladding metal layer, the core and cladding may have a substantially identical chemical composition, obviously within measurement and control accuracy when producing such products. This improves compatibility between the core and cladding layer when producing the clad metal article.

In an alternatively embodiment, the amount of one or more alloying elements in the core metal layer and the cladding metal layer may be chosen in variation with respect to each other to achieve a further balance in engineering properties in the clad metal article.

In an embodiment the core metal layer has a Sc-content in a range of 0.05% to 0.25%, and preferably in a range of about 0.1% to 0.22%, for example at about 0.14% or at about 0.16%. The cladding metal layer has a Sc-content in a range of about 0.2% to 1%, for example of about 0.25%. In particular when high solidification rates during casting are applied in the manufacturing process of producing the cladding metal layer the Sc level can be up to 1%, for example at about 0.5% or at about 0.9%. In casting processes like direct chill (DC) casting of slabs or billets solidification rates up to about 100 K/sec are reached resulting in that Sc levels of up to about 0.3% are used.

The clad metal article according to this invention can be provided as an extruded article and more preferably as a rolled article.

In an embodiment of the clad metal article, the clad metal article is provided in the form of a rolled product and wherein the cladding metal layer has a thickness in a range of about 1% to 70%, and preferably in a range of about 2% to 25%, of the thickness of the core metal layer.

In an embodiment of the clad metal article, the clad metal article is provided in the form of a rolled product and wherein the at least one side of the core metal layer is provided with multiple cladding metal layers of different Sc content. For example a core metal layer having a Sc-content of about 0.16% can be provided with a first cladding metal layer having a Sc-content of about 0.21% and a second cladding layer having a Sc-content of about 0.28% on the outside of the first cladding metal layer.

The clad metal article according to this invention can be formed using analogue techniques as for a uni-alloy metal article, for example by means of creep-forming or superplastic-forming.

In manufacturing the clad metal article according to this invention the cladding metal layer may be applied to the core metal layer by any suitable means such as by means of roll cladding. The clad metal article in extruded form may be manufactured for example by the extrusion technique as disclosed in patent document WO-2007/070731 published on Jun. 21, 2007, in particular in paragraphs [0063] to [0068], the disclosure of which publication is specifically incorporated herein by reference.

In an aspect of the invention it also relates to a method of producing a rolled clad metal article, the method comprises:
(i) providing a cladding on at least one face of the core ingot by co-casting to form a clad ingot, and
(ii) rolling said clad ingot to produce a plate article or sheet article having a core metal layer and at least one cladding layer.

In an embodiment the co-casting step (i) is carried out by casting the core ingot onto the cladding layer at a point where the metal of the cladding metal layer is at a temperature between the solidus temperature and liquidus temperature of the metal of the cladding metal layer to produce a substantially continuous metallurgical bond between the metal layers. This co-casting method and apparatus are also described in US patent Publication No. 2005/0011630 published on Jan. 20, 2005 (the disclosure of which publication is specifically incorporated herein by reference).

In another embodiment the co-casting step (i) is carried out by casting the cladding layer in molten form onto a solid core ingot.

In a further aspect of the invention there is provided a welded structure comprising of a clad metal article according to this invention and at least one aluminium alloy stiffening element joined to the cladding metal layer by means of a welding operation.

In an embodiment the invention relates to a welded structural member of an aircraft comprising of a rolled clad metal article according to this invention and at least one aluminium alloy stiffening element, preferably a stringer, joined to the cladding metal layer by means of a welding operation, for example by means of laser beam welding or by friction stir welding.

The invention also comprises an aircraft or spacecraft, the fuselage of which is wholly or partially constructed out of the welded structure according to this invention, which may be incorporated into various structural portions of the aircraft. For example, the various disclosed embodiments may be used to form structural portions in the wing assemblies and/or structural portions in the tail assembly. The aircraft is generally representative of commercial passenger aircraft, which may include, for example, the 737, 747, 757, 767 and 777 commercial passenger aircraft available from The Boeing Company, or the A320, A350 and A380 commercial passenger aircraft available from Airbus S.A.S. In alternative embodiments, the present invention may also be incorporated into flight vehicles of other types. Examples of such flight vehicles included manned or unmanned military aircraft, rotary wing aircraft, or even ballistic flight vehicles.

EXAMPLE

A fuselage sheet of the AA5024-series aluminium alloy having 0.23% Sc can be joined to an AlMgSc stringer element for example by means of laser beam welding. The Sc level in the fuselage sheet should be at this level to arrive at a high Sc level in the fusion zone to benefit from the favourable welding characteristics.

In accordance with the invention a more favourable welded structure is obtained when using an AA5024 core sheet having an AA5024 cladding of about 8%, wherein the core sheet has a Sc level of about 0.14% to optimise mechanical properties and the cladding layer has a Sc level of about 0.23% to benefit from the welding characteristics which are favoured with a relatively high Sc content. The AlMgSc stringer can be welded to the cladding layer in the same manner as with the monolithic fuselage sheet. The clad metal article made from the AA5024 alloy with different levels of Sc in the core layer and in the cladding layer can be produced by means of for example regular roll bonding as in known in the art.

While preferred and alternate embodiments of the invention have been described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

The invention claimed is:

1. An extruded or rolled clad metal article having a core metal layer and a cladding metal layer on at least one surface of the core layer, wherein said metals of said core metal layer and said cladding metal layer are each aluminium alloys having 3% to 8% Mg and Sc in a range of 0.05% to 1%, and wherein the Sc-content in the core metal layer is at least 0.02% lower than in said cladding metal layer.

2. A clad metal article according to claim 1, wherein said metals of said core metal layer and said cladding metal layer are each aluminium alloys having, in wt. %,
Mg 3% to 8%
Mn up to 1.4%
Sc 0.05% to 1%
Ag up to 0.5%
Zn up to 2%
Cu up to 2%
Li up to 3%
optionally one or more elements selected from the group consisting of Zr 0.03 to 0.4%, Cr 0.03 to 0.4%, Hf 0.03 to 0.4%, and Ti 0.005 to 0.4%,
Fe up to 0.35%
Si up to 0.25%
inevitable impurities and balance aluminium.

3. A clad metal article according to claim 2, wherein Mg of said core metal layer and said cladding metal layer are each 3.9% to 6%.

4. A clad metal article according to claim 2, wherein Mg of said core metal layer and said cladding metal layer are each 3.8% to 4.7%.

5. A clad metal article according to claim 2, consisting of said core metal layer and said cladding metal layer on at least one surface of the core layer, wherein Mn of said core metal layer and said cladding metal layer are each up to 0.25%.

6. A clad metal article according to claim 1, wherein said metals of said core metal layer and said cladding metal layer are each aluminium alloys having, in wt. %,
Mg 3.8% to 5.1%
Mn up to 0.4%
Sc 0.05% to 1%
Zn up to 0.4%
Cu up to 0.25%
Cr up to 0.10%
Zr 0.05 to 0.20%
Ti up to 0.20%
Fe up to 0.35%
Si up to 0.25%
others and inevitable impurities each maximum 0.05%, total maximum 0.15, and balance aluminium.

7. A clad metal article according to claim 1, wherein the core metal layer has a Sc-content in a range of 0.05% to 0.25% and the cladding metal layer has a Sc-content in a range of 0.2% to 1%.

8. A clad metal article according to claim 1, wherein the core metal layer is made from an aluminium alloy having a composition within AA5024.

9. A clad metal article according to claim 1, wherein said cladding metal layer has a thickness in a range of 1% to 70% of the thickness of the core metal layer.

10. A clad metal article according to claim 1, wherein the clad metal article is a rolled article.

11. A clad metal article according to claim 1, wherein the clad metal article is an extruded article.

12. Welded structure comprising a clad metal article according to claim 1, and at least one aluminium alloy stiffening element joined to the cladding metal layer by welding.

13. Welded structural member of an aircraft comprising a rolled clad metal article according to claim 1, and at least one aluminium alloy stiffening element, joined to the cladding metal layer by welding.

14. The welded structural member of claim 13, wherein the at least one aluminium alloy stiffening element, comprises a stringer joined to the cladding metal layer welding.

15. A clad metal article according to claim 1, wherein the Sc-content in the core metal layer is at least 0.04% lower than in said cladding metal layer.

16. A method of producing a rolled clad metal article according to claim 1, the method comprises:
providing a cladding on at least one face of the core ingot by co-casting to form a clad ingot, and
rolling said clad ingot to produce a plate article or sheet article having a core layer and at least one cladding layer.

17. Method according to claim 16, wherein the co-casting step comprises casting the core ingot onto the cladding layer at a point where the metal of the cladding layer is at a temperature between the solidus temperature and liquidus temperature of the metal of the cladding layer.

18. Method according to claim 16, wherein the co-casting step comprises casting the cladding layer in molten form onto a solid core ingot.

\* \* \* \* \*